United States Patent [19]

Steels

[11] 4,004,716
[45] Jan. 25, 1977

[54] APPARATUS FOR DISPENSING CONFECTIONERY

[75] Inventor: Gordon Steels, Peterborough, England

[73] Assignee: Baker Perkins Holdings Limited, England

[22] Filed: Aug. 20, 1975

[21] Appl. No.: 606,093

[30] Foreign Application Priority Data

Aug. 28, 1974 United Kingdom ............ 37648/74

[52] U.S. Cl. ............................................ 222/145
[51] Int. Cl.² ......................................... B67D 5/46
[58] Field of Search ............ 222/146 HE, 145, 137, 222/136, 135, 138, 133, 275, 383, 384, 385, 255, 400.8, 401, 402

[56] References Cited
UNITED STATES PATENTS

| | | | |
|---|---|---|---|
| 1,714,260 | 5/1929 | Davis et al. ................... | 222/385 X |
| 2,218,363 | 10/1940 | Sundholm ....................... | 222/383 |
| 2,493,660 | 1/1950 | Elkins ............................. | 222/133 |
| 2,536,400 | 1/1951 | Thompson ..................... | 222/135 X |
| 2,557,880 | 6/1951 | Lynn .............................. | 222/385 X |
| 3,390,814 | 7/1968 | Creighton, Jr. et al. ...... | 222/145 X |
| 3,550,814 | 12/1970 | von Lersner .................. | 222/145 |

Primary Examiner—Stanley H. Tollberg
Assistant Examiner—Norman L. Stack, Jr.
Attorney, Agent, or Firm—Watson, Cole, Grindle & Watson

[57] ABSTRACT

A depositor for effecting simultaneous deposition of two different confectionery materials into a mould beneath it. The depositor includes separate hoppers disposed out of contact with one another for the reception of the two materials, an independently controllable heater associated with each hopper, coaxially disposed inner and outer nozzles disposed beneath the hoppers, pumping mechanism for discharging material from one hopper to the inner nozzle and from the other hopper to the outer nozzle, and thermal insulation between the two nozzles.

3 Claims, 4 Drawing Figures

APPARATUS FOR DISPENSING CONFECTIONERY

BACKGROUND OF THE INVENTION

Sweets consisting of an outer shell of hard candy and a softer filling are at present made by forming the hard candy into a hollow rope, introducing the filling continuously into the centre of the rope, reducing the diameter of the filled rope by passage through sizing rollers and moulding it into individual filled sweets by passing the rope between moulding wheels having co-operating moulding cavities.

This procedure, although it produces sweets which are otherwise wholly acceptable, has the disadvantage that the kneading action to which the hard candy is subjected, during formation of the rope and subsequent moulding, results in loss of clarity in the outer shell and a resulting loss in customer appeal.

Centre filled sweets having an outer shell of fondant and like materials are made by deposition of the ingredients from a moving head depositor into moulds travelling continuously in procession beneath the depositor. The moulds normally extend between parallel conveyor chains and in the case of small moulds are disposed in rows aligned transversely with respect to the chains. The depositor is divided into compartments to contain the materials which are to form the shells and the centres of the sweets, moves forwardly with the conveyor and then back again and pumps material through coaxial nozzles into the moulds during the forward movement of the hopper.

A depositing procedure, using single nozzles, can be used to deposit hard candy directly into moulds to produce sweets consisting solely of clear hard candy. Existing forms of depositor cannot, however, be used for filled hard candy because it is necessary to deposit hard candy at a relatively high temperature, approximately 138° C, whereas the softer filling contains a substantial amount of moisture and requires to be deposited at a temperature of the order of 70° C. Accordingly, the interface temperature, when a conventional hopper is used, between the shell and the centre at the time of deposit will be above the boiling point of the filling material and the centre material will boil out and burst through the shell.

SUMMARY OF THE INVENTION

With a view to avoiding this difficulty, the invention provides a depositor for effecting simultaneous deposition of two different confectionery materials into a mould beneath it, said depositor comprising separate hoppers disposed out of contact with one another for the reception of the two materials, an independently controllable heater associated with each hopper, coaxially disposed inner and outer nozzles disposed beneath the hoppers, pumping mechanism for discharging material from one hopper to the inner nozzle and from the other hopper to the outer nozzle, and thermal insulation between the two nozzles.

One embodiment of moving head depositor according to the invention will now be described in detail, by way of example, with reference to the accompanying drawings, in which each Figure is a cross-sectional view of the depositor and a mould beneath it.

DESCRIPTION OF THE PREFERRED EMBODIMENT

Figure 1:
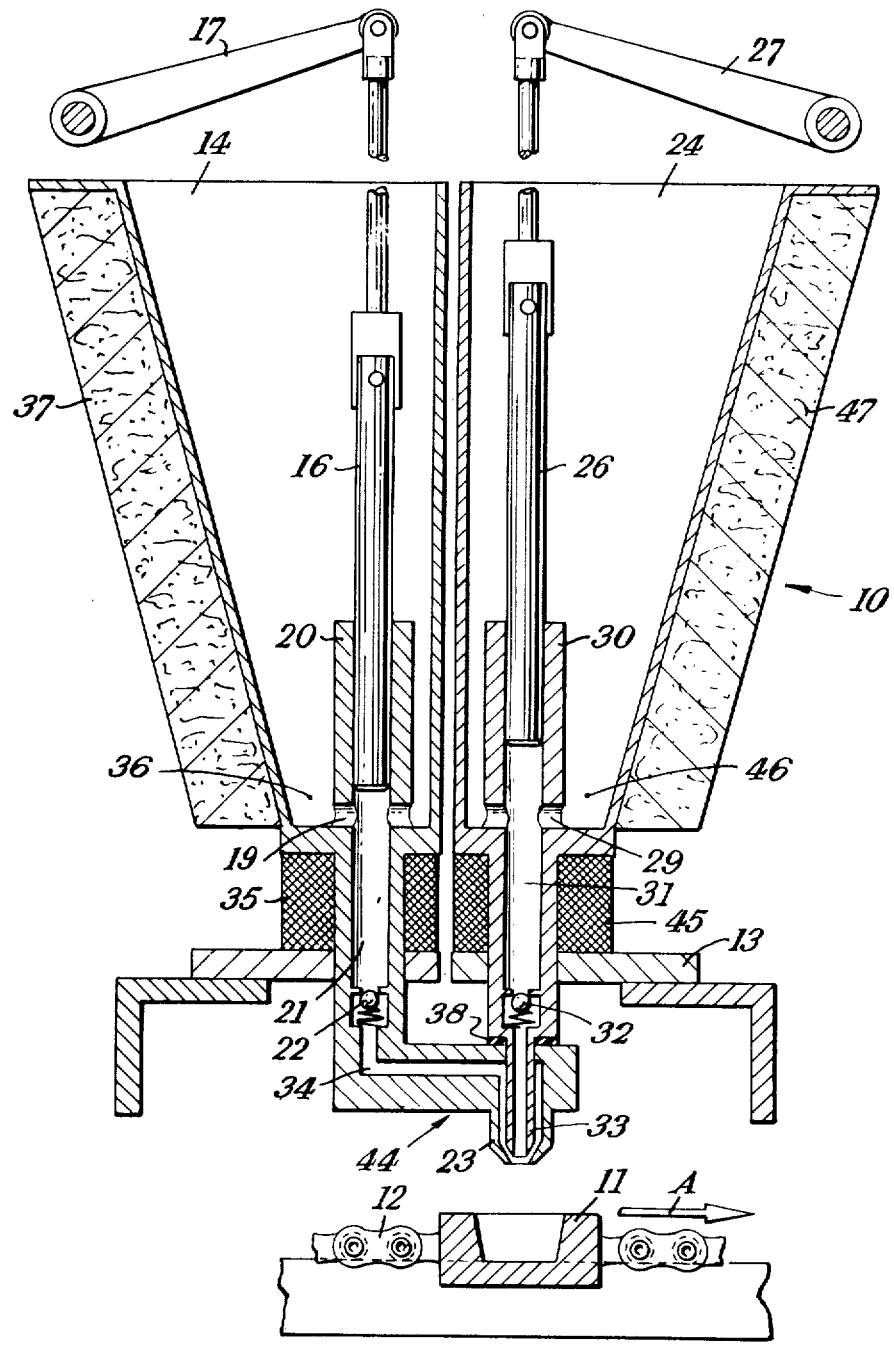
FIG. 1 shows a depositor, with the filling materials omitted with the parts in the positions they occupy during the return stroke, and FIGS. 2, 3 and 4 respectively show successive stages in the operation of the depositor during the depositing stroke.

As shown in each Figure the depositor 10 is disposed above a procession of moulds 11 which are advanced continuously by chains, one of which is shown at 12, in the direction of the arrow A in FIG. 1. The depositor 10 is supported on a frame 13 which is reciprocated in the direction of the arrow A, by means not shown, to cause the depositor to advance at the same speed as the moulds during a depositing stroke in which it deposits shell and centre materials into the mould beneath it as described below, followed by a rapid return stroke in the opposite direction into position above the next succeeding mould. A typical conventional moving head depositor is described in British Pat. No. 405374

Figure 2:
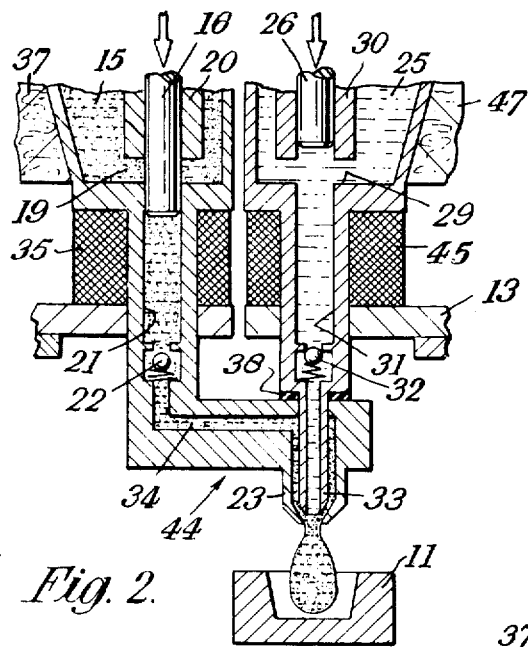
Figure 3:
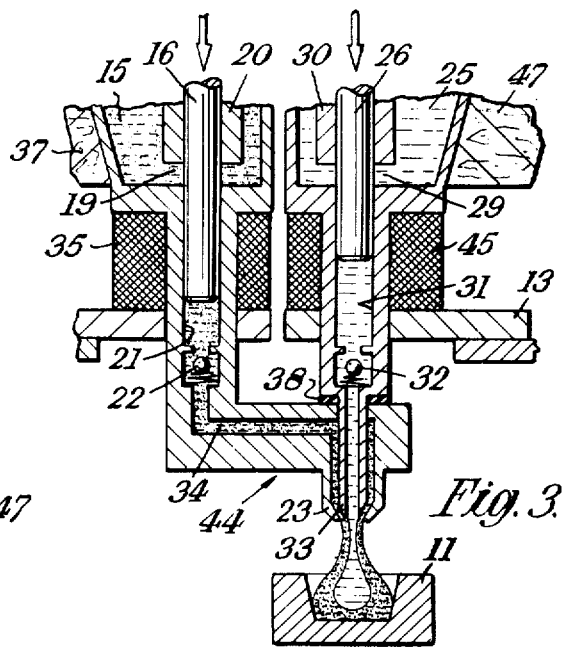
Figure 4:
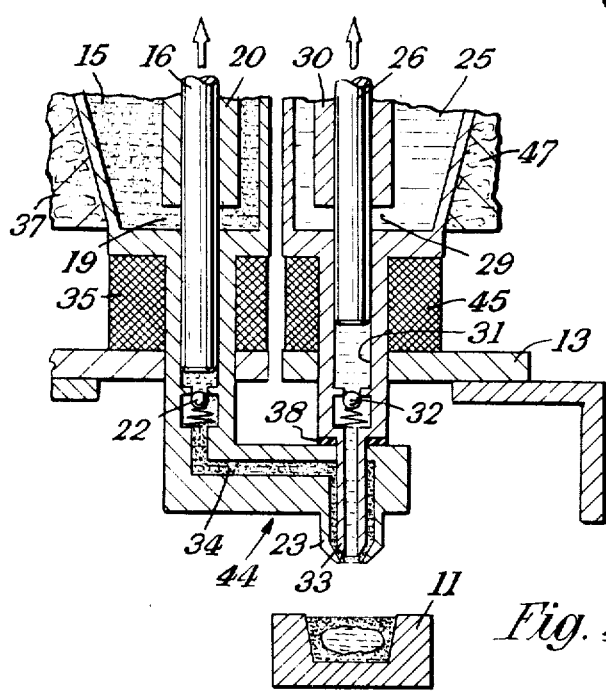

The depositor 10 includes two completely separated hoppers 14, 24 mounted on the frame 13 and respectively containing shell forming material 15 and centre forming material 25 (see FIGS. 2 to 4). The hoppers 14, 24 respectively contain independently operated plungers 16, 26 which serve, as described below, to deposit the materials 15 and 25 into the mould 11 during the depositing stroke. The plungers 16, 26 are reciprocated by respective cam operated levers 17, 27.

In the upper position shown in FIG. 1, the plungers 16, 26 clear ports 19, 29 in respective sleeves 20, 30 to allow cavities 21, 31 in the sleeves to fill with material from their respective hoppers as shown in FIG. 2.

During the upward movement of the plungers 16 and 26 to the position shown in FIG. 1, spring loaded ball valves 22 and 32 close on their respective seats and cause a vacuum to be created in the cavities 21 and 22 which assist them to fill up with material when the plungers clear the inlet ports 19 and 20.

When the plungers move down material is discharged through the inlet ports 19 and 29 into the hoppers 14 and 24 until these ports are covered by the plungers and the ball valves 22 and 32 are then forced off their seats by the pressure exerted by the plungers and the material passes through to a nozzle assembly 44 beneath the hoppers.

The nozzle arrangement includes an inner nozzle 33 directly beneath the plunger 26 and concentric with an outer nozzle 23, to which the material for the shell passes through a channel 34 in the nozzle assembly.

The bases of the hoppers 14 and 24 are heated by independent heating pads 35 and 45 which are controlled by temperature sensors 36 and 46. The walls of the hoppers are also heated by jackets 37 and 47 which are maintained at the appropriate temperatures for the materials contained in the hoppers. Heating can be by electrical pad heaters, steam or water jackets, oil jackets or any form of heating which can be controlled.

A pad of thermal insulation 38 is provided between the upper wall of channel 23 and cavity 31 to reduce to a minimum conduction of heat from one plunger unit to another. In this way the temperature of the material in each hopper can be controlled independently of that in other hopper until the moment of deposit.

FIG. 2 shows the start of the deposit, the plunger 16 having moved down to close the inlet port 19 and deliver the shell material through the outer nozzle 23 into the cavity in the mould 11 underneath. The other plunger 26, though it has begun to move down, has not yet closed the inlet port 29 yet and therefore some of the material drawn in during the upward suction stroke is being returned to the hopper 24 and no centre material is emerging from the inner nozzle 33.

This stage is followed, as shown in FIG. 3, by simultaneous deposition of shell and centre material, the plunger 26 having closed the inlet port 29 and delivering through the inner nozzle 33 a filling of centre material into the deposit being made through the outer nozzle 23 by the plunger 16.

FIG. 4 shows the end of the deposit. The plunger 26 has completed its downward depositing stroke before the plunger 16 and to effect a clean cut-off, the plunger 26 is timed to start its suction stroke during the latter part of the depositing stroke of the plunger 16. The centre material in the deposit in the mould 11 is thus completely enveloped in shell material as shown in FIG. 4.

The amounts of shell and centre material in the deposit can be varied by adjusting the strokes of the plungers beyond the inlet ports 19 and 29 and the depositing and suction stoke of each plunger can be individually phased to adjust the position of the centre in the deposit. Alternatively the plungers can be rephased so as to deposit one material on top of the other.

As will be appreciated the apparatus illustrated can also be used to produce a single deposit of one material only, by putting one plunger out of action, or to produce centre filled deposits having a shell of material other than hard candy, the temperatures at which the hoppers are maintained being suitably regulated.

The drawings show a single pair of plungers 16, 26 serving to deposit in a single mould supported between the chains 12. In practice a row of several moulds will normally be disposed between the chains and a corresponding number of pairs of simultaneously operating plungers and discharge nozzles will be provided.

What I claim as my invention and desire to secure by Letters Patent is:

1. A dispenser for effecting simultaneous deposition of first and second confectionary materials into a mould arranged beneath said dispenser so as to form in the mould a deposit having a shell of the first material surrounding a filling of the second material, said dispenser comprising:
    a first hopper for containing the first material;
    a second hopper for containing the second material, said second hopper being physically separated from said first hopper;
    a first heater for heating the first material in said first hopper;
    a second heater for heating the second material in said second hopper, said second heater being independent from said first heater;
    a nozzle assembly arranged beneath said hoppers, said nozzle assembly including an inner nozzle and an annular outer nozzle surrounding said inner nozzle;
    a first conduit connecting said outer nozzle to said first hopper;
    a second conduit connecting said inner nozzle to said second hopper, said second conduit being separate from said first conduit;
    a first plunger mounted for reciprocating movement in said first hopper for causing discharge of the first material from said first hopper through said first conduit to said outer nozzle;
    a second plunger mounted for reciprocating movement in said second hopper for causing discharge of the second material from said second hopper through said second conduit to said inner nozzle;
    said first plunger commencing discharge of the first material before said second plunger has commenced discharge of the second material and terminating discharge of the first material after said second plunger has terminated discharge of the second material; and
    thermal insulation arranged between said first and second conduits at a location adjacent said nozzle assembly.

2. A dispenser as defined in claim 1, wherein: each of said plungers is mounted within a vertically extending sleeve in its respective hopper for reciprocating movement, each said sleeve having at its lower end and inlet port to its respective hopper, said inlet port being opened by upward movement of said respective plunger; and each of said conduits includes a normally closed discharge valve arranged to be opened, upon downward movement of said respective plunger, so as to allow discharge of material through said conduit.

3. A dispenser as defined in claim 2, wherein each of said discharge valves is a spring-loaded ball valve.

* * * * *